US007861935B2

(12) United States Patent
Chen

(10) Patent No.: US 7,861,935 B2
(45) Date of Patent: Jan. 4, 2011

(54) LABEL SHEET OUT-FEEDING DETECTION DEVICE FOR BARCODE PRINTER

(75) Inventor: Ching-Wen Chen, Taipei (TW)

(73) Assignee: TSC Auto ID Technology Co., Ltd., I-Lan Hsien (TW)

( * ) Notice: Subject to any disclaimer, the term of this patent is extended or adjusted under 35 U.S.C. 154(b) by 180 days.

(21) Appl. No.: 12/318,714

(22) Filed: Jan. 7, 2009

(65) Prior Publication Data

US 2009/0174139 A1 Jul. 9, 2009

(30) Foreign Application Priority Data

Jan. 7, 2008 (TW) .............................. 97200327 U

(51) Int. Cl.
*G06K 7/10* (2006.01)

(52) U.S. Cl. ............................ 235/462.14; 400/120.17; 400/613.582; 221/73

(58) Field of Classification Search ............ 235/462.14; 400/120.17, 613.582; 221/73
See application file for complete search history.

(56) References Cited

U.S. PATENT DOCUMENTS 5,229,587 A * 7/1993 Kimura et al. .............. 235/432
5,923,357 A * 7/1999 Sugimoto et al. ........... 347/171
6,068,419 A * 5/2000 Shiozaki et al. ............. 400/582
6,491,459 B2 * 12/2002 Hosomi ...................... 400/613
6,505,981 B1 * 1/2003 Takami et al. ............... 400/602
7,416,628 B2 * 8/2008 Carver et al. ................ 156/249
2003/0189490 A1 * 10/2003 Hogerton et al. ......... 340/572.8

* cited by examiner

*Primary Examiner*—Allyson N Trail
(74) *Attorney, Agent, or Firm*—Rosenberg, Klein & Lee

(57) ABSTRACT

A label sheet out-feeding detection device is provided for a barcode printer and includes a guide member coupled to a front enclosure of the barcode printer. The guide member forms at least one pair of opposing rails. Two casing members are combined to each other to form a combined casing movably received between the rails of the guide member for conducting up and down movement. The combined casing has a top portion forming a detection channel. A guide rail is formed inside the casing. A least a pair of photo-electric detection elements is respectively mounted on wall portions of the casing respectively above and below the detection channel for detecting out-feeding of a label sheet passing through the detection channel. At least one resilient device has an end coupled to the guide member and an oppose end engaging a bottom portion of the casing. At least one positioning bar has an end pivotally jointed to the guide member and an opposite end forming a positioner fit into and movably received in the guide rail of the casing. When the casing is depressed, the location of the positioner of the positioning bar within the guide rail is changed. The casing is selectively and resiliently raised up for conducting detection or depressed down for being concealed inside the casing. Thus, a label sheet out-feeding detection device that is switchable between an operation condition and a concealed and stowed condition by means of depression is realized.

16 Claims, 10 Drawing Sheets

LABEL SHEET OUT-FEEDING DETECTION DEVICE FOR BARCODE PRINTER

BACKGROUND OF THE INVENTION

1. Field of the Invention

The present invention relates to a label sheet out-feeding detection device of a barcode printer, and in particular to a label sheet out-feeding detection device that is switchable between a projecting detection/operation condition and a depressed and stowed condition by simple and resiliently biased depression.

2. The Related Arts

A conventional barcode printer contains a label sheet which is contained inside the barcode printer for printing thereon barcodes by the operation of a printing mechanism and then out-fed. To control the label sheet out-feeding and the feeding precision thereof, a detection device is arranged on a front enclosure of the barcode printer to detect the out feeding condition of the label sheet and provide reference signal on which the printing operation and out feeding operation of the printing mechanism and the barcode printer are based. Thus, the detection precision and sensitivity of the label sheet out-feeding detection device is of importance for the quality of printing and out feeding of the label sheet.

The conventional label sheet out-feeding detection device of the barcode printers is a reflective photo-electric detection device, which occupies an amount of space outside the enclosure of the barcode printer. The reflective photo-electric detection device is susceptible to interference caused by natural light or other light sources, leading to detection error or deterioration of detection sensitivity. Further, in the time period when no label sheet passes therethrough to be detected thereby, the detection device is not shielded and is thus directly exposed to dust contamination and interference caused by the surrounding light or other light sources, leading to false detection caused by error reflection signal and incorrect printing operation and affecting feeding and quality of printing of the label sheet.

The conventional label sheet out-feeding detection device is arranged outside the barcode printer, and thus occupying a space that might be required for operating the barcode printer. This makes the construction of the barcode printer complicated in order to cope with such a space problem, leading to increase of manufacturing costs and adverse factors for market competition.

SUMMARY OF THE INVENTION

Thus, in view of the above discussed problems, the present invention is aimed to provide a label sheet out-feeding detection device for a barcode printer in order to solve the above problems associated with false operation and poor detection and sensitivity of the label sheet out-feeding detection device.

To achieve the above goal, in accordance with the present invention, a label sheet out-feeding detection device is provided for a barcode printer and comprises a guide member coupled to a front enclosure of the barcode printer. The guide member forms at least one pair of opposing rails. Two casing members are combined to each other to form a combined casing movably received between the rails of the guide member for conducting up and down movement. The combined casing has a top portion forming a detection channel. A guide rail is formed inside the casing. A least a pair of photo-electric detection elements is respectively mounted on wall portions of the casing respectively above and below the detection channel for detecting out-feeding of a label sheet passing through the detection channel. At least one resilient device has an end coupled to the guide member and an oppose end engaging a bottom portion of the casing. At least one positioning bar has an end pivotally jointed to the guide member and an opposite end forming a positioner fit into and movably received in the guide rail of the casing. When the casing is depressed, the location of the positioner of the positioning bar within the guide rail is changed. The casing is selectively and resiliently raised up for conducting detection or depressed down for being concealed inside the casing. Thus, a label sheet out-feeding detection device that is switchable between an operation condition and a concealed and stowed condition by means of depression is realized.

The effectiveness of the label sheet out-feeding detection device of the present invention is that the label sheet out-feeding detection device is switchable between a projecting operation condition and a concealed and stowed condition. In addition, a blocking type detection of the out-feeding of the label sheet is adapted so that interference caused by the surrounding light or natural light can be eliminated, effectively improving detection and out-feeding operation of the label sheet. Further, the detection device in accordance with the present invention can be switched between the operation condition and the stowed condition by means of simple depression so that the label sheet out-feeding detection device does not occupy excessive volume of the barcode printer, making the construction of the barcode printer simpler and suiting the needs of the industry.

BRIEF DESCRIPTION OF THE DRAWINGS

The present invention will be apparent to those skilled in the art by reading the following description of preferred embodiments thereof, with reference to the attached drawings, wherein.

DETAILED DESCRIPTION OF THE PREFERRED EMBODIMENTS

Figure 1:
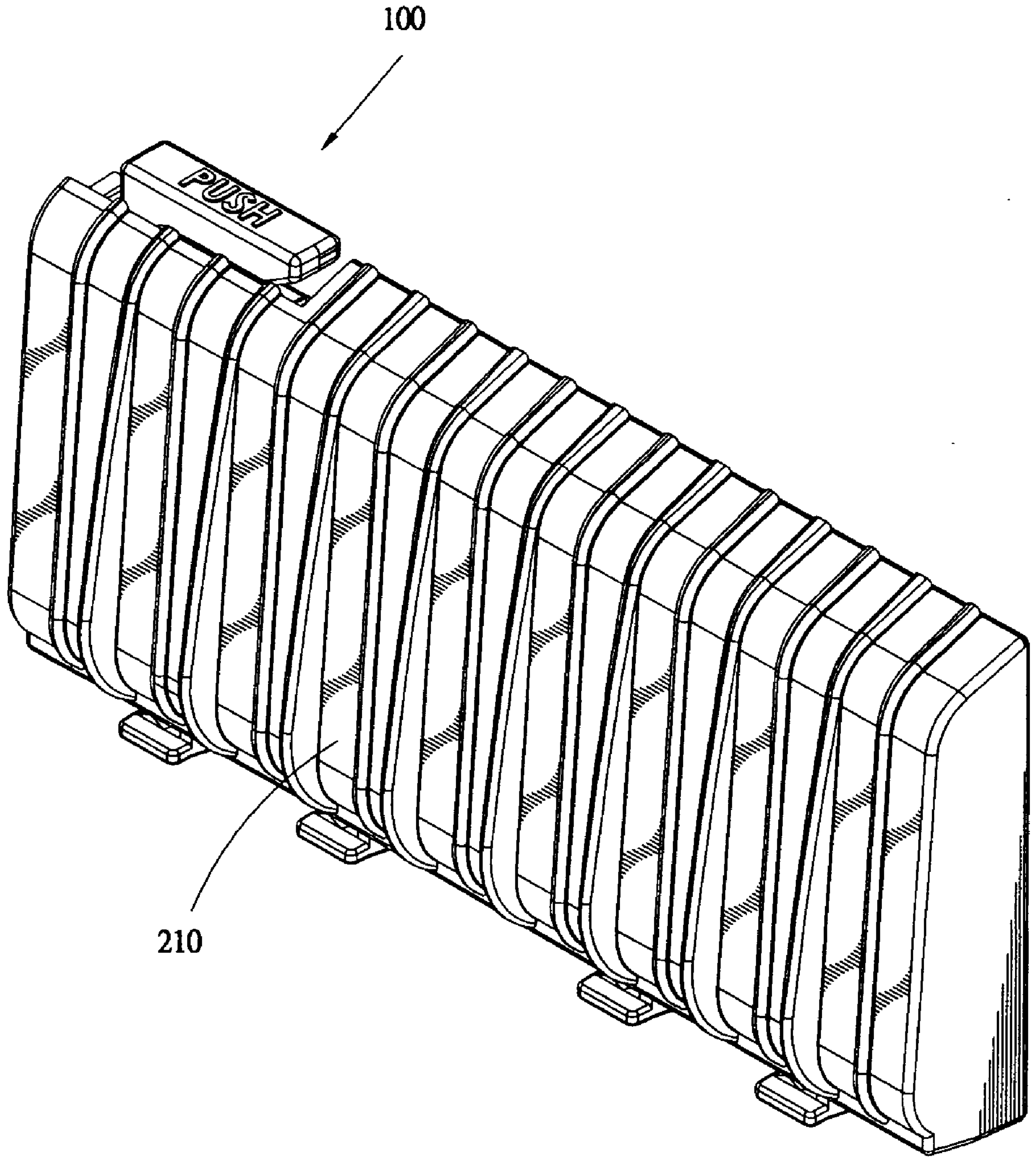
FIG. 1 is a perspective view of a label sheet out-feeding detection device constructed in accordance with a first embodiment of the present invention.
Figure 2:
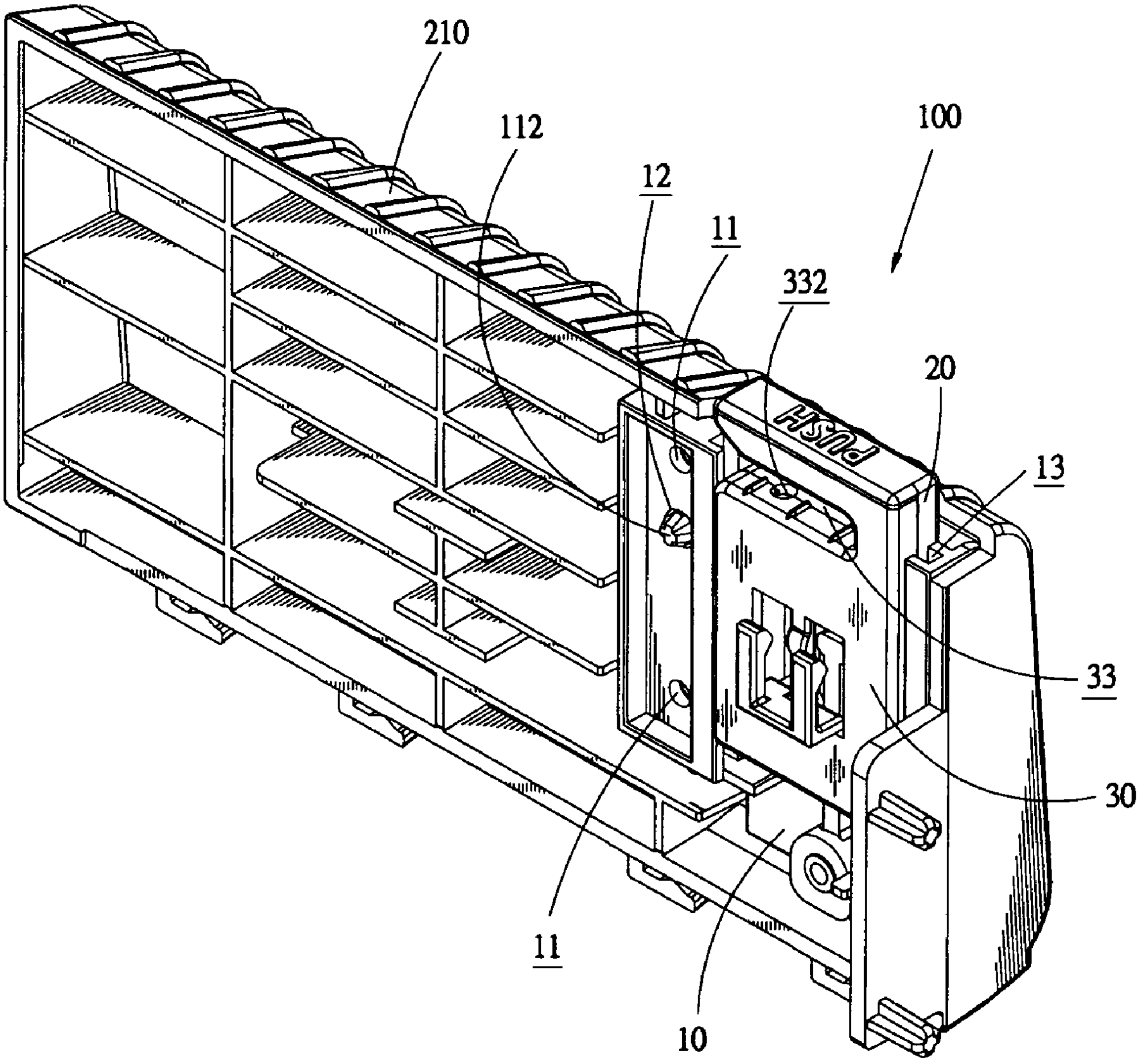
FIG. 2 is another perspective view of the label sheet out-feeding detection device of FIG. 1 taken from a different angle.
Figure 3:
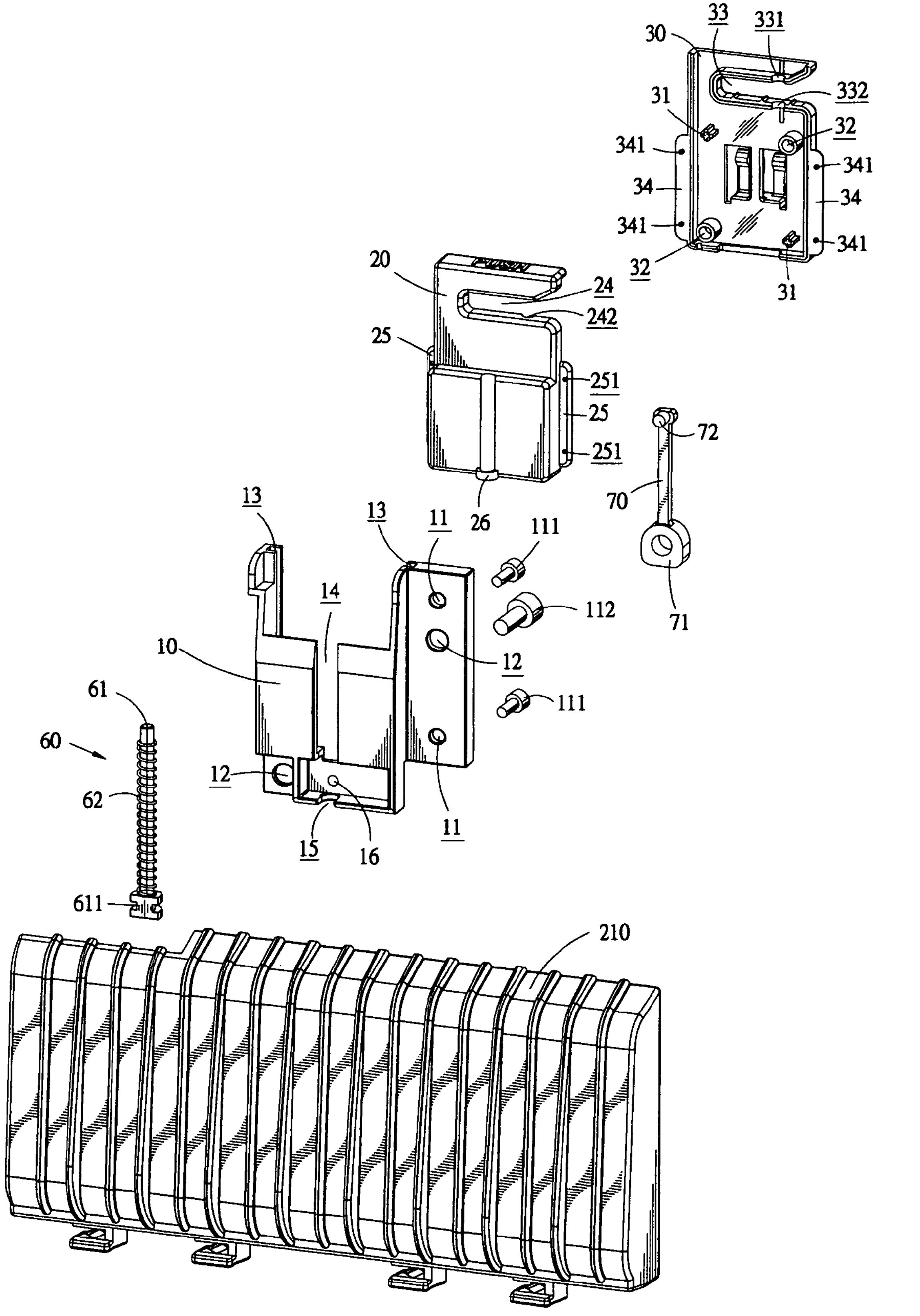
FIG. 3 is an exploded view of the label sheet out-feeding detection device of FIG. 1.
Figure 6:
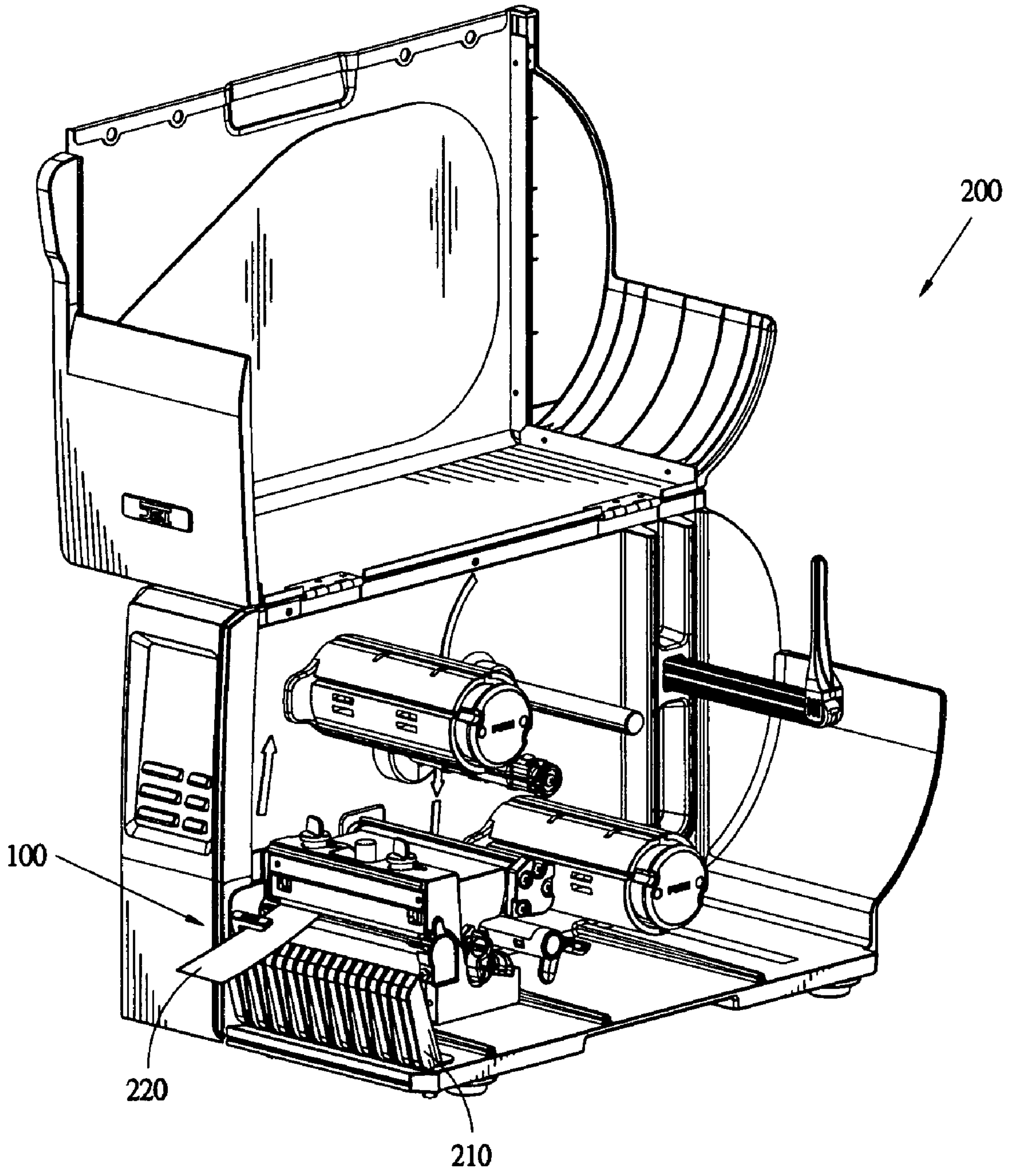
FIG. 6 is a perspective view of a barcode printer in which the label sheet out-feeding detection device of the present invention is embodied.

With reference to the drawings and in particular to FIGS. 1-3, a label sheet out-feeding detection device constructed in accordance with a first embodiment of the present invention, generally designated at 100, is provided for a barcode printer 200 (FIG. 6). The label sheet out-feeding detection device 100 comprises a guide member 10 having edges forming a plurality of mounting holes 11, 12 for receiving bolts 111, 112 that are fixed to an inside surface of a front enclosure 210 of the barcode printer 200. The guide member 10 forms at least one pair of opposing channel-like rails 13. The guide member 10 also forms at least one slot 14. A lower portion of the guide member 10, as viewed in the drawings, forms a fitting cutoff 15 and a pivot 16.

Figure 4:
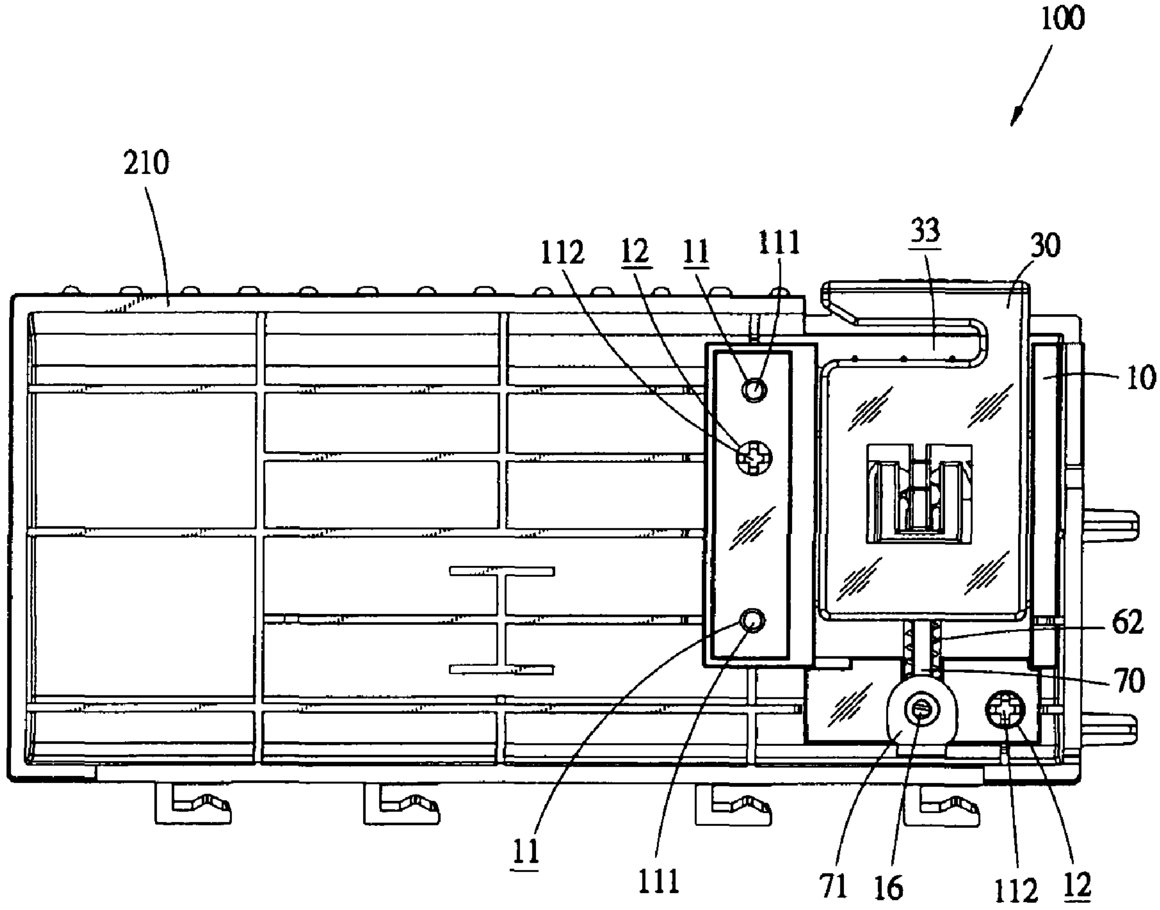
FIG. 4 is a rear view of the label sheet out-feeding detection device of FIG. 1.
Figure 5:
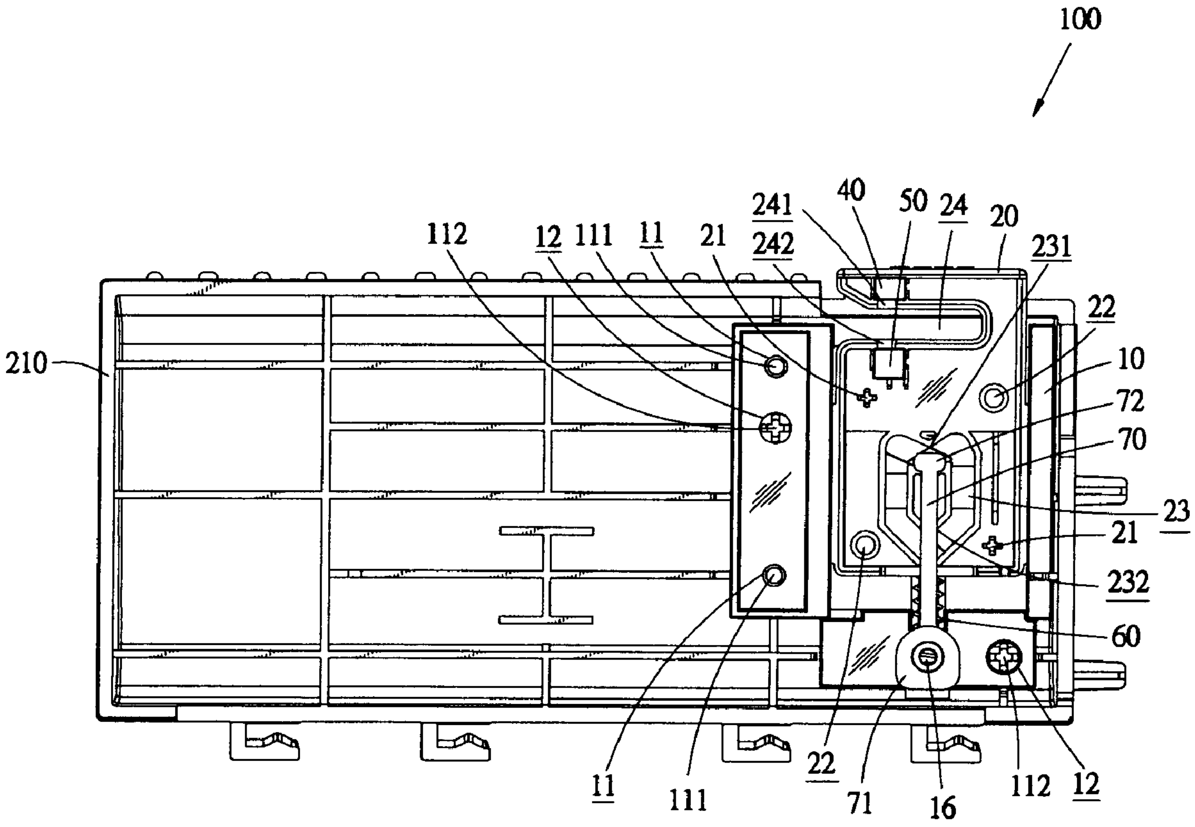
FIG. 5 is also a rear view of the label sheet out-feeding detection device with a casing member removed to show inside details in which a positioner of a positioning bar is positioned on a top stop of a guide rail inside a casing.

Also referring to FIGS. 4 and 5, a pair of casing members 20, 30, which mate each other to form a combined casing, is movably received in the guide member 10 and guided by the rails 13. The first casing member 20 forms therein pegs 21 and hole 22 and the second casing member 30 also forms therein pegs 31 and holes 32, wherein the pegs 21 are fit into the holes 32 and the pegs 31 are fit into the holes 22 to have the casing members 20, 30 mating and fixed to each other. It is noted that the combination of the casing members 20, 30 can be done with any known construction and is not limited to the illustration given herein. Other equivalents are considered within the scope of the present invention.

The first casing member 20 forms therein at least one guide rail 23 having upper and lower extremes respectively forming a top stop 231 and a bottom stop 232. Formed on a top portion of the first casing member 20 is a detection channel 24, which is delimited by upper and lower walls formed as portions of the first casing member 20. In the upper and lower walls of the casing member 20, detection notches 241, 242 are respectively formed and align each other. Opposite sides of the first casing member 20 form two fitting flanges 25 in which holes 251 are defined. The bottom portion of the first casing member 20 forms, on an outside surface thereof, an engagement projection 26.

The second casing member 30 has a top portion forming a detection channel 33, which is delimited by upper and lower walls that are formed as portions of the second casing member 30. The upper and lower walls respectively form detection notches 331, 332 that align each other. Opposite sides of the second casing member 30 form two fitting flanges 34 on which pegs 341 are formed. The pegs 341 correspond to and are respectively fit into the holes 251 of the fitting flanges 25 of the first casing member 20 so that the fitting flanges 25, 34 are fixed to each other as unitary flanges movably received in the rails 13; and the detection notches 241, 242 of the first casing member 20 and the detection notches 331, 332 of the second casing member 30 are respectively combined together to each define a complete through hole. And the detection channels 24, 33 are combined as a single channel.

At least one pair of photo-electric detection elements 40, 50 is respectively received in the through holes formed by the combinations of the detection notches 241, 242 and 331, 332 located above and below the combined channels 24, 33 in the top portions of the casing members 20, 30 so that the photo-electric detection elements 40, 50 are set above and below the combined channels 24, 33. One of the photo-electric detection elements 40, 50 transmits a light beam, while the other receives the light beam and they thus constitute a blocking type photo-electric detection assembly.

At least one resilient device 60 comprises at least one post 61 and a spring 62. The post 61 has a lower end forming a fitting portion 611, which is fit into the fitting cutoff 15 defined in the lower portion of the guide member 10 so as to mount the post 61 to the guide member 10 with the post 61 corresponding to the slot 14 of the guide member 10. The spring 62 encompasses the post 61 and has an upper end abutting against the engagement projection 26 formed on the bottom portion of the first casing member 20.

At least one positioning bar 70 has a lower end forming a pivotal joint portion 71, which is rotatably fit over the pivot 16 formed on the lower portion of the guide member 10, whereby the positioning bar 70 is rotatably mounted to the lower portion of the guide member 10. The positioning bar 70 has an upper end forming a positioner 72, which is fit into and movably received in the guide rail 23 of the first casing member 20. Due to the pivotal joint realized by the pivotal joint portion 71, the positioner 72 is cable to conduct movement along the guide rail 23 and selectively positioning and staying on the top stop 231 or the bottom stop 232. FIG. 4 illustrates the condition where the positioner 72 is retained on the top stop 231, and the spring 62 of the resilient device 60 is compressed to have the casing members 20, 30 concealed in the rails 13 of the guide member 10.

Figure 7:
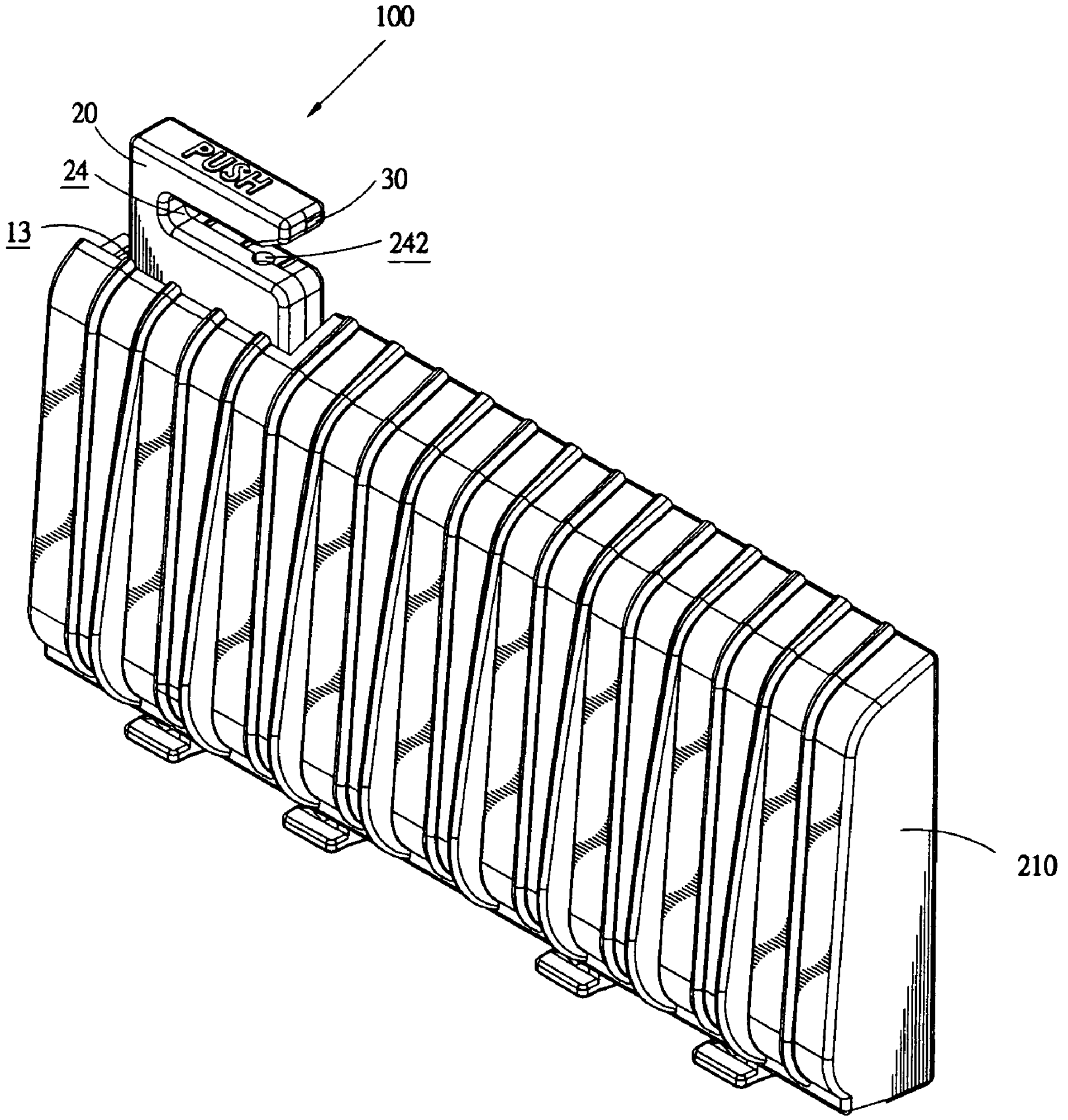
FIG. 7 is a perspective view of the label sheet out-feeding detection device of the present invention with a casing projecting beyond top ends of rails thereof.
Figure 8:
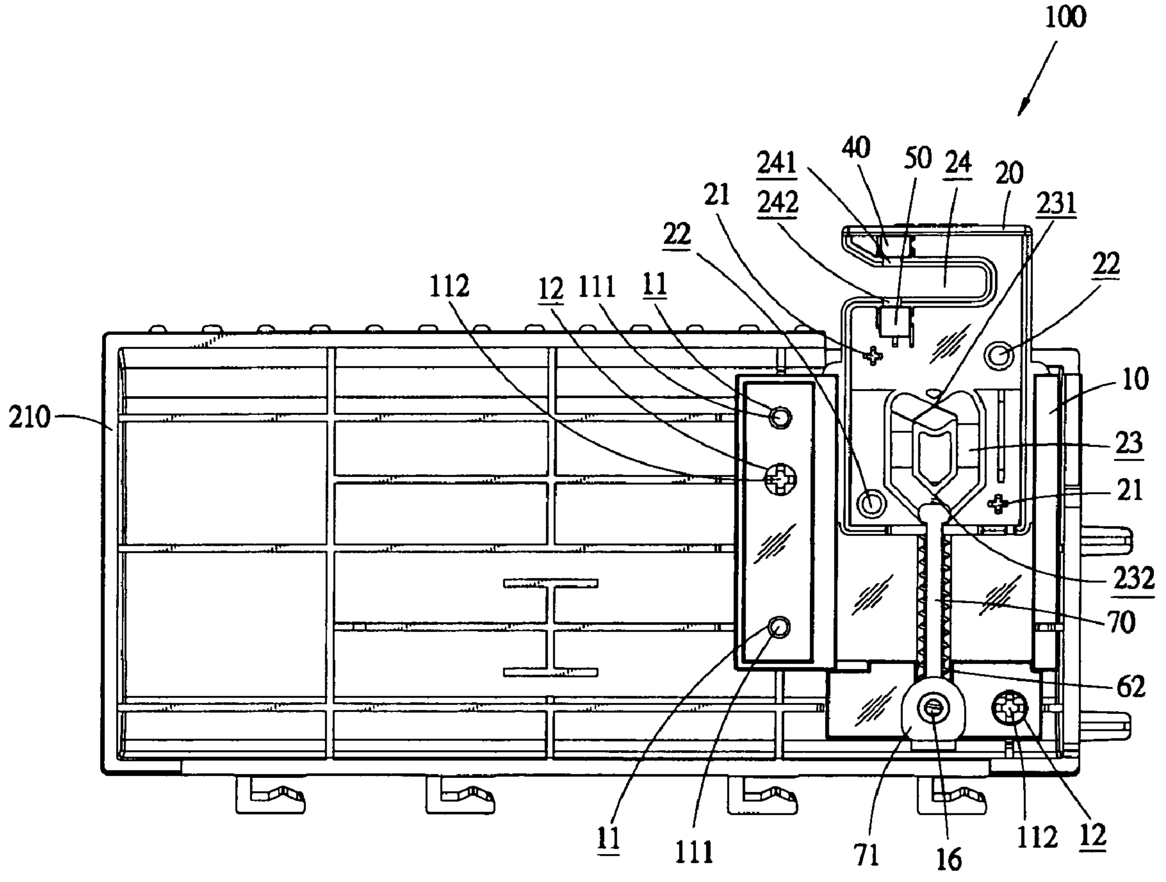
FIG. 8 is a rear view of the label sheet out-feeding detection device with a casing member removed to show inside details, in which a positioner of a positioning bar is positioned on a bottom stop of a guide rail inside a casing.

Also referring to FIGS. 6-8, the operation of the label sheet out-feeding detection device 100 of the present invention is illustrated. When the combined casing members 20, 30 are depressed downward, the positioner 72 of the positioning bar 70 is guided by and moves along the guide rail 23 to disengage from the top stop 231 of the guide rail 23 and then the spring 62 of the resilient device 60 is allowed to release the spring force thereof to urge the combined casing members 20, 30 upward due to contact with the engagement projection 26, causing the combined casing members 20, 30 to move upward along the rails 13 and eventually projecting beyond the top ends of the rails 13, by which the positioner 72 is set on the bottom stop 232. Under this condition, the detection channels 24, 33 of the casing members 20, 30 are exposed outside the rails 13, and the photo-electric detection elements 40, 50 are located on opposite sides or banks of the channels 24, 33 and oppose each other in a vertical direction for carrying out detection operation. With a label sheet 220 out fed from the barcode printer 200 through the combined detection channels 24, 33, blocking occurs between the photo-electric detection elements 40, 50 and the out-feeding of the label sheet 220 is detected. The result of detection by the photo-electric detection elements 40, 50 is transmitted to the barcode printer 200 to serve as a basis on which the printing and out-feeding operations of the label sheet 220 are carried out.

When the photo-electric detection elements 40, 50 are not in use, the combined casing members 20, 30 are depressed down to have the positioner 72 of the positioning bar 70 that is originally set on the bottom stop 232 of the guide rail 23, under the guidance of the guide rail 23, moving upward to set on the top stop 231 of the guide rail 23; the spring 62 of the resilient device 60 is simultaneously subjected to compression by the engagement thereof with the engagement projection 26 of the first casing member 20, whereby the casing members 20, 30 are received and concealed between the rails 13 of the guide member 10, returning to the position illustrated in FIG. 1, under which condition, the photo-electric detection elements 40, 50 are no long detecting the label sheet 220.

Figure 9:
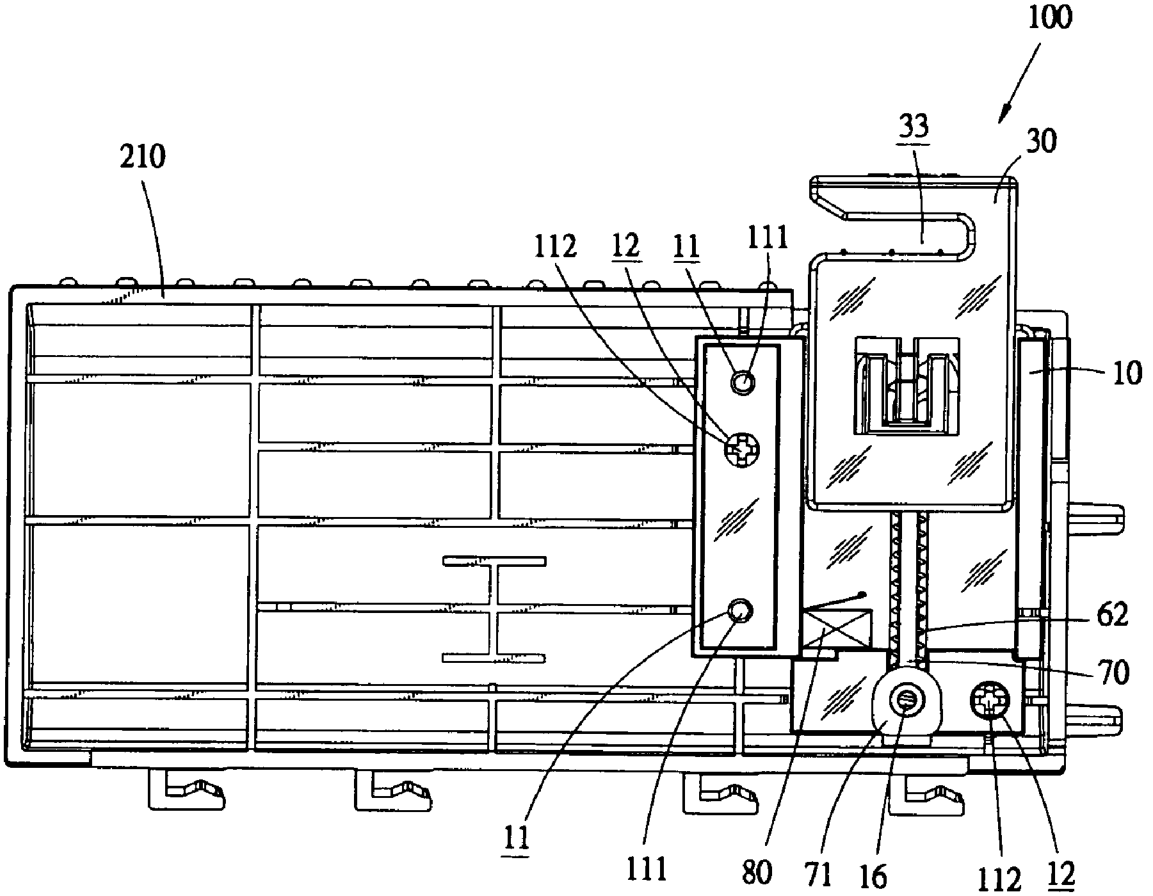
FIG. 9 is a rear view of a label sheet out-feeding detection device constructed in accordance with a second embodiment of the present invention.
Figure 10:
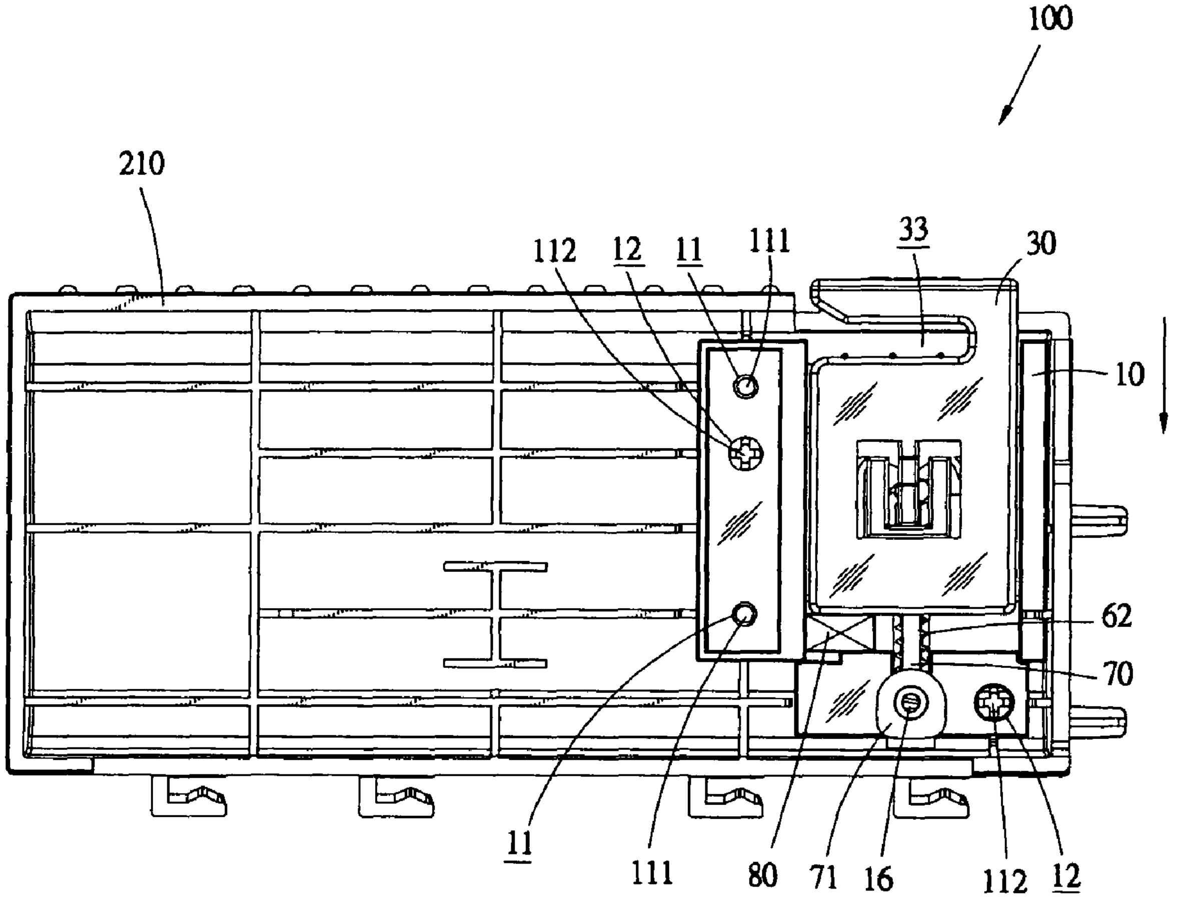
FIG. 10 is a rear view similar to FIG. 9 but showing a casing of the label sheet out-feeding detection device depressed to engage a detection switch.

Referring to FIGS. 9 and 10, a second embodiment of the label sheet out-feeding detection device in accordance with the present invention is shown, also designated with reference numeral 100, for simplicity. At least one detection switch 80 is arranged on the bottom portion of the guide member 10. The switch 80 can be of any known types and a micro-switch is taken as an example in the following description. It is noted that other types of switch, such as a proximity switch or a photo-electric switch, are considered within the scope of the present invention. The detection switch 80 functions to detect the upward and downward movement of the combined casing members 20, 30 to provide a reference for controlling the photo-electric detection elements 40, 50. In particular, when the combined casing members 20, 30 are moved upward to project beyond the top ends of the rails 13, the combined casing members 20, 30 are separated from the detection switch 80, as shown in FIG. 9, so as to set the switch 80 in an "ON" condition, by which power is supplied to the photo-electric detection elements 40, 50, enabling the detection function of the photo-electric detection elements 40, 50 for detecting the printing and out-feeding of the label sheet 220.

On the other hand, when the combined casing members 20, 30 are depressed downward into between the rails 13, the bottom of the combined casing members 20, 30 engages the detection switch 80, see FIG. 10, so as to set the detection switch 80 in an "OFF" condition and power supply to the photo-electric detection elements 40, 50 is cut off, disabling the detection function of the photo-electric detection elements 40, 50. In this way, saving of power consumed by the photo-electric detection elements 40, 50 and extension of lifespan of the photo-electric detection elements 40, 50 are realized.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A label sheet out-feeding detection device for a barcode printer, comprising:

a guide member coupled to a front enclosure of the barcode printer, the guide member forming at least one pair of opposing rails;

two casing members mating each other to form a combined casing, at least one of the casing members forming a guide rail having top and bottom extremes forming top and bottom stops respectively, the combined casing having a top portion forming a detection channel;

at least a pair of photo-electric detection elements mounted to the top portion of the combined casing and respectively arranged on wall portions of the combined casing that are respectively above and below the detection channel so that the photo-electric detection elements are respectively located above and below the detection channel and are opposing each other to detect out-feeding of a label sheet passing through the detection channel;

at least one resilient device coupled to a lower portion of the guide member, the resilient device having an upper end abutting against a bottom portion of the combined casing; and at least one positioning bar having a lower end pivotally jointed to the lower portion of the guide member to have the positioning bar pivotally connected to the guide member, the positioning bar having an upper end forming a positioner, which is fit into and movably received in the guide rail of the combined casing, wherein the positioner is movable along the guide rail between the top and bottom stops of the guide rail and selectively positionable and removably retained on the top and bottom stops and wherein the combined casing is selectively concealed between the rails of the guide member and projects beyond top ends of the rails of the guide member with the resilient device being resiliently compressed or released.

2. The label sheet out-feeding detection device as claimed in claim 1, wherein the guide member has edge portions forming a plurality of mounting holes.

3. The label sheet out-feeding detection device as claimed in claim 1, wherein the guide member forms at least one slot.

4. The label sheet out-feeding detection device as claimed in claim 1, wherein the guide member has a lower portion forming a fitting cutoff.

5. The label sheet out-feeding detection device as claimed in claim 1, wherein the guide member has a lower portion forming a pivot.

6. The label sheet out-feeding detection device as claimed in claim 1, wherein the guide member has a lower portion to which a detection element is mounted.

7. The label sheet out-feeding detection device as claimed in claim 6, wherein the detection element comprises a micro-switch.

8. The label sheet out-feeding detection device as claimed in claim 1, wherein the casing members form therein pegs and holes.

9. The label sheet out-feeding detection device as claimed in claim 1, wherein the casing members form fitting flanges on opposite sides thereof.

10. The label sheet out-feeding detection device as claimed in claim 9, wherein the fitting flanges form pegs.

11. The label sheet out-feeding detection device as claimed in claim 9, wherein the fitting flanges form holes.

12. The label sheet out-feeding detection device as claimed in claim 1, wherein the lower portion of the combined casing forms an engagement projection.

13. The label sheet out-feeding detection device as claimed in claim 1, wherein the combined casing forms detection holes on opposite side walls of the detection channel.

14. The label sheet out-feeding detection device as claimed in claim 1, wherein the resilient device comprises:

at least one post having a lower end coupled to the lower portion of the guide member; and at least one spring encompassing the post and abutting against the lower portion of the combined casing.

15. The label sheet out-feeding detection device as claimed in claim 14, wherein the post has a lower end forming a fitting portion.

16. The label sheet out-feeding detection device as claimed in claim 1, wherein the positioning bar has a lower end forming a pivotal joint portion.

* * * * *